(12) United States Patent
Ishikawa et al.

(10) Patent No.: US 9,678,493 B2
(45) Date of Patent: Jun. 13, 2017

(54) POSITION DETECTION APPARATUS AND POSITION CONTROL APPARATUS

(71) Applicant: OLYMPUS CORPORATION, Tokyo (JP)

(72) Inventors: Takashi Ishikawa, Tokyo (JP); Masanori Shimoyama, Tokyo (JP); Rintaro Nishihara, Tokyo (JP)

(73) Assignee: Olympus Corporation, Tokyo (JP)

( * ) Notice: Subject to any disclaimer, the term of this patent is extended or adjusted under 35 U.S.C. 154(b) by 396 days.

(21) Appl. No.: 14/480,715

(22) Filed: Sep. 9, 2014

(65) Prior Publication Data

US 2014/0379103 A1  Dec. 25, 2014

Related U.S. Application Data

(63) Continuation of application No. PCT/JP2012/083403, filed on Dec. 25, 2012.

(30) Foreign Application Priority Data

Mar. 28, 2012  (JP) ................................. 2012-073253

(51) Int. Cl.
    *G05B 15/02*    (2006.01)
    *G03B 5/00*    (2006.01)
    (Continued)

(52) U.S. Cl.
    CPC .............. *G05B 15/02* (2013.01); *G03B 5/00* (2013.01); *G05D 3/00* (2013.01); *H02P 29/685* (2016.11);
    (Continued)

(58) Field of Classification Search
    None
    See application file for complete search history.

(56) References Cited

U.S. PATENT DOCUMENTS 4,646,014 A  2/1987 Eulenberg
6,104,231 A  8/2000 Kirkpatrick, II
(Continued)

FOREIGN PATENT DOCUMENTS

CN   1934412 A   3/2007
JP   2000-002505 A   1/2000
(Continued)

OTHER PUBLICATIONS

International Search Report dated Jan. 29, 2013 issued in PCT/JP2012/083403.
(Continued)

*Primary Examiner* — WB Perkey
(74) *Attorney, Agent, or Firm* — Scully, Scott, Murphy & Presser, P.C.

(57) ABSTRACT

The invention provides a position detection apparatus comprising:
  a base part,
  a moving part movable relatively with respect to the base part,
  a position detection part that detects a position of the moving part relative to the base part on the basis of a magnetic flux change to produce position data,
  a temperature detection part that detects an ambient temperature,
  a position correction part that calculates a correction value on the basis of a difference between the position data and a given reference value and the ambient temperature, and corrects the position data on the basis of the calculated correction value to produce a first corrected position data, and
  a linearity correction part that corrects the first corrected position data on the basis of the correction value for nonlinearity of the position detection part to produce a second corrected position data, wherein:

(Continued)

the position detection part is capable of detecting position value as far as a position area where, within a position range of relative movement of the moving part to the base part, the magnetic flux change in association with a change in an amount of the relative movement is nonlinear.

3 Claims, 18 Drawing Sheets

(51) Int. Cl.
| | | |
|---|---|---|
| *H04N 5/225* | (2006.01) | |
| *G05D 3/00* | (2006.01) | |
| *H02P 29/00* | (2016.01) | |
| *H02P 25/06* | (2016.01) | |
| *H02P 29/68* | (2016.01) | |

(52) U.S. Cl.
CPC ... *H04N 5/2253* (2013.01); *G03B 2205/0038* (2013.01); *G03B 2205/0053* (2013.01); *H02P 25/06* (2013.01)

(56) References Cited

U.S. PATENT DOCUMENTS

| | | | |
|---|---|---|---|
| 6,279,374 B1 | 8/2001 | Irokawa et al. | |
| 9,031,395 B2 * | 5/2015 | Shimoyama | G03B 5/00 396/55 |
| 2007/0133970 A1 | 6/2007 | Honjo et al. | |
| 2009/0268310 A1 | 10/2009 | Honjo et al. | |
| 2010/0310245 A1 | 12/2010 | Honjo et al. | |
| 2012/0014681 A1 * | 1/2012 | Miyahara | G02B 27/646 396/55 |
| 2014/0375829 A1 * | 12/2014 | Nishihara | G03B 5/00 348/208.7 |
| 2014/0379103 A1 * | 12/2014 | Ishikawa | G03B 5/00 700/56 |

FOREIGN PATENT DOCUMENTS

| | | |
|---|---|---|
| JP | 2005-227373 A | 8/2005 |
| JP | 2006-047054 A | 2/2006 |
| JP | 2010-191210 A | 9/2010 |
| JP | 2011-170260 A | 9/2011 |
| JP | 2012-013778 A | 1/2012 |

OTHER PUBLICATIONS

Jun, X., "Using S-C Processor Software to Achieve the Sensor's Temperature Error Compensation", China Academic Journal Electronic Publishing House, Jul. 25, 2002, pp. 97-99, with English Language abstract.

* cited by examiner

POSITION DETECTION APPARATUS AND POSITION CONTROL APPARATUS

BACKGROUND OF THE INVENTION

The present invention relates to a position detection apparatus for detecting the position of a moving part relative to a base part and a position control apparatus for moving the moving part on the basis of position data detected by the position detection apparatus.

So far, an imaging optical system such as digital cameras has an image-shake correction apparatus mounted on it, which is adapted to move an imaging device or an optical element such as lenses, for the purpose of preventing image shakes during image taking. Such an image-shake correction apparatus is designed to move the imaging device or optical element on the basis of an output value from a gyro sensor mounted on an imaging apparatus body. For control of movement of a moving object such as imaging device or optical element, there is feedback control implemented to move the moving object on the basis of the position of the moving object detected using a Hall sensor or the like. The Hall sensor used for position detection is known to vary in terms of output performance depending on temperatures.

Patent Publication 1 discloses one such image-shake correction apparatus in which ambient temperatures are detected by use of two Hall elements without recourse to any exclusive temperature sensor, and Patent Publication 2 discloses that upon position detection by a magnetic sensor, position compensation by temperature changes is implemented by correction of shakes without recourse to any add-on temperature sensor.

Patent Publication 1: JP(A) 2006-47054
Patent Publication 2: JP(A) 2011-170260

SUMMARY OF THE INVENTION

The present invention provides a position detection apparatus comprising:
a base part,
a moving part movable relatively to the base part,
a position detection part that detects the position of the moving part relative to the base part on the basis of a magnetic flux change to produce position data,
a temperature detection part that detects an ambient temperature, and
a position correction part that calculates a correction value on the basis of a difference between the position data and a given reference value and the ambient temperature, and making correction of the position data on the basis of the correction value thus calculated.

Still other objects and advantages of the invention will in part be obvious and will in part be apparent form the specification.

The invention accordingly comprises the features of construction, combinations of elements, and arrangement of parts which will be exemplified in the construction hereinafter set forth, and the scope of the invention will be indicated in the claims.

DESCRIPTION OF EXEMPLARY EMBODIMENTS

One embodiment of the invention is now explained. It is to be noted that the position control apparatus according to the embodiment of the invention here is explained typically as an image-shake correction apparatus used for taking images of good quality while influences of camera-shake or other shakes are kept under control.

The Hall elements used in Patent Publications 1 and 2 are known to have output fluctuations in association with ambient temperature changes. For this reason, the output values from the Hall elements must be compensated for temperatures. By the way, there is a lot of demand for size reductions of a digital camera or other imaging apparatus. In such situations, the image-shake correction apparatus mounted within the imaging apparatus, too, must meet size reduction requirements. If the size of the image-shake correction apparatus is reduced, a position detection apparatus including a magnetic sensor such as Hall elements is then expected to have detection errors due to factors other than the ambient temperature. When such detection errors caused by factors other than the ambient temperature are taken into consideration, another, separate compensation is usually carried out in addition to the compensation based on the ambient temperature changes: plural such compensation operations require complicated computation processing.

According to one embodiment of the invention, the size of the position detection apparatus can be reduced by extending the detection range of a magnetic sensor such as Hall elements as far as a region which has not been used hitherto and in which a magnetic flux density becomes nonlinear. It is then possible to make temperature compensation by position data and ambient temperature even in the nonlinear magnetic flux density area so that position detection is achievable with high precision all over the driving area.

According to the embodiment of the invention here, it is thus possible to make use of a difference between the position data and a given value and the ambient temperature so as to make sure easy calculation of the position of the moving part with high precision even in the nonlinear magnetic flux density region. This will enable the precision of position detection to be more improved even in an extended detection range.

Figure 1:
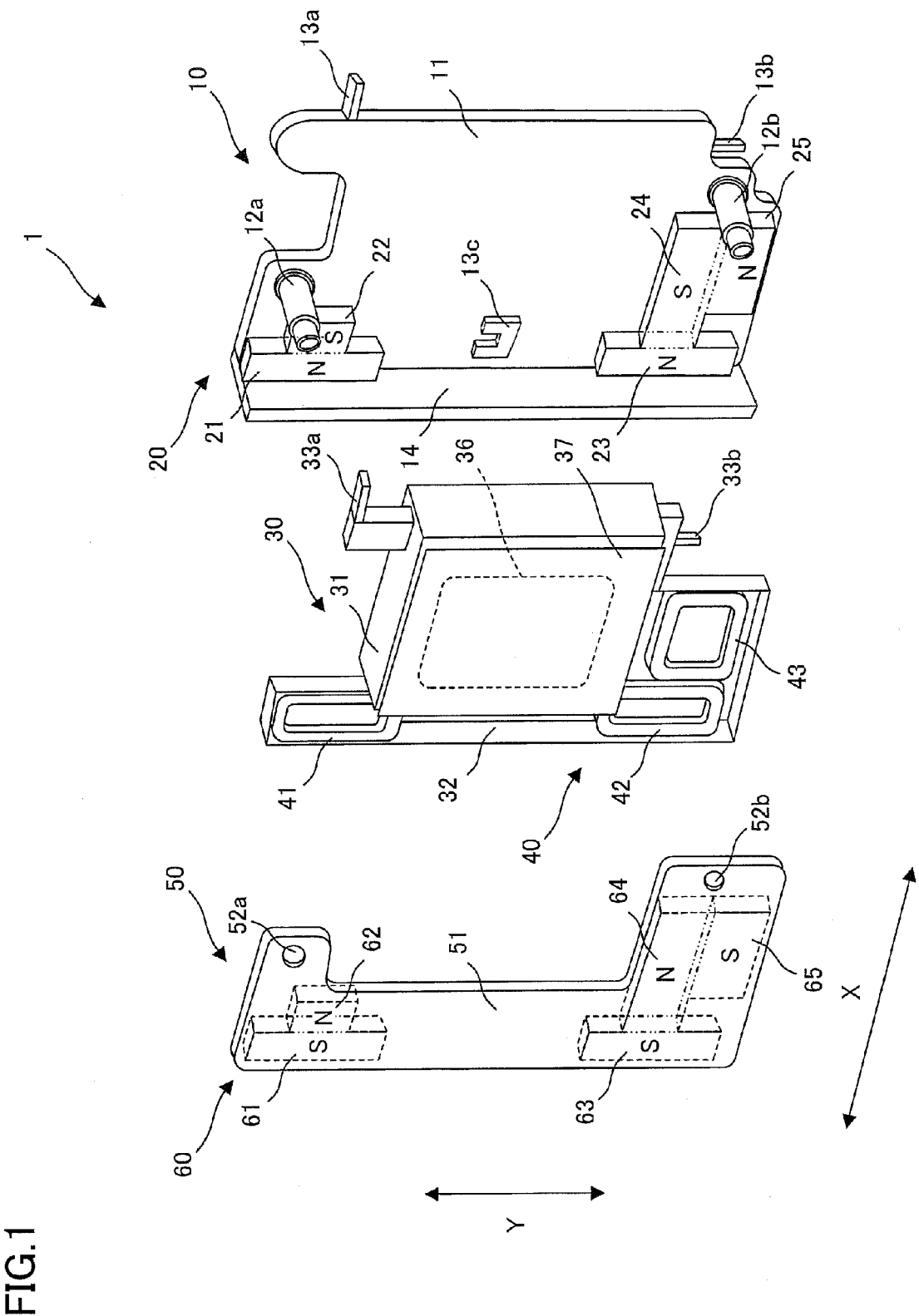
FIG. 1 is illustrative of the before-assembly image shake correction apparatus 1 according to one embodiment of the invention.

FIG. 1 is illustrative of the before-assembly image-shake correction apparatus 1 according to the first embodiment of the invention. The image-shake correction apparatus 1 according to the embodiment of the invention here comprises a base part 10, a moving part 30 movably supported on the base part 10, and a magnet support part 50 that is opposed to the base part 10 with the moving part 30 between them and fixed to the base part 10.

The base part 10 is fixedly provided with a first permanent magnet group 20, and the magnet support part 50 is fixedly provided with a second permanent magnet group 60. The moving part 30 is fixedly provided with a coil group 40. The first and second permanent magnet groups 20 and 60 include oppositely magnetized and located portions in such a way as to generate a magnetic field in an opposite space. The coil group 40 is located in a space where the first permanent magnet group 20 is opposite to the second permanent magnet group 60. In FIG. 1 and the following figures, it is noted that the magnetic poles of the first and second permanent magnet groups 20 and 60 face on the side of the coil group 40.

Figure 2:
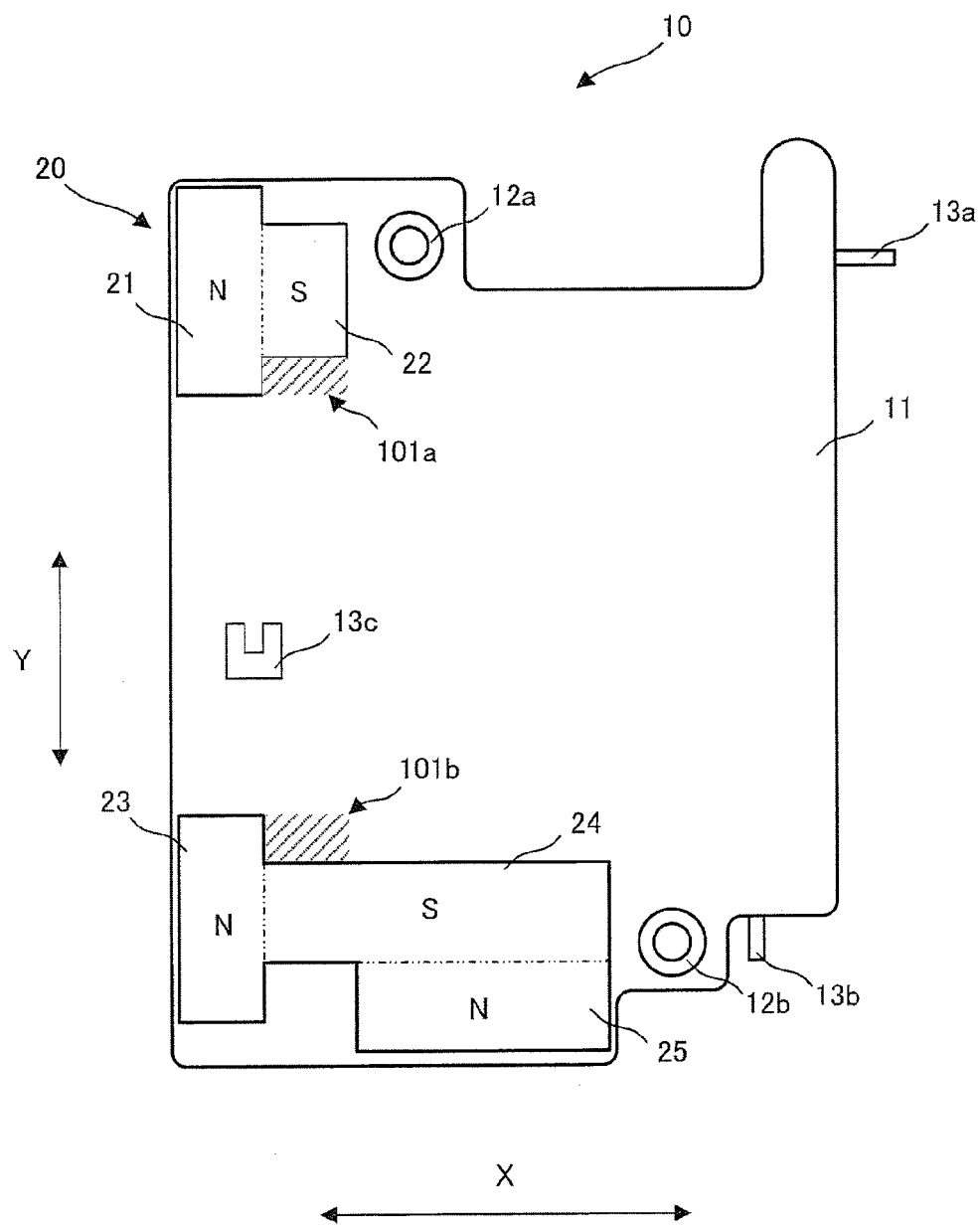
FIG. 2 is illustrative of the base part 10.

FIG. 2 is illustrative of the base part 10. The base part 10 comprises a flat plate base body 11 formed of a magnetic material such as iron or an iron compound, supporting through-holes 12a and 12b that are provided through the base body 11 for inserting screws (not shown) through them to support the magnet support part 50 on the base part 10, and a first set of spring supports 13a, 13b and 13c for supporting springs (not shown) to support the moving part 30 on the base part 10 in a movable manner.

Here the X direction is defined as a first direction to the base part 10, and the Y direction is defined as a second direction orthogonal to the X direction, as depicted in FIG. 2.

The first permanent magnet group 20 on the base part 10 comprises a first magnet part 21 that is N pole-magnetized on the coil group 40 side, a second magnet part 22 that opposes to the first magnet part 21 in the X direction and is S pole-magnetized on the coil group 40 side, a third magnet part 23 that is located away from the first magnet part 21 in the Y direction and N-magnetized on the coil group 40 side, a fourth magnet part 24 that opposes to the third magnet part 23 in the X direction and is S pole-magnetized on the coil group 40 side, and a fifth magnet part 25 that opposes to the fourth magnet part 24 in the Y direction and N pole-magnetized on the coil group 40 side. Note here that the faces of the first 21 to the fifth magnet part 25 on the coil group 40 side and the opposite side are oppositely magnetized.

The side of the second magnet part 22 in the Y direction of the fourth magnet part 24 is shorter than the first magnet part 21 with a first space 101a leaving as a cutout that is not opposite to the first magnet part 21, and the side of the fourth magnet part 24 in the Y direction of the second magnet part 22 is shorter than the third magnet part 23 with a second space 101b leaving as a cutout that is not opposite to the third magnet part 23.

Figure 3:
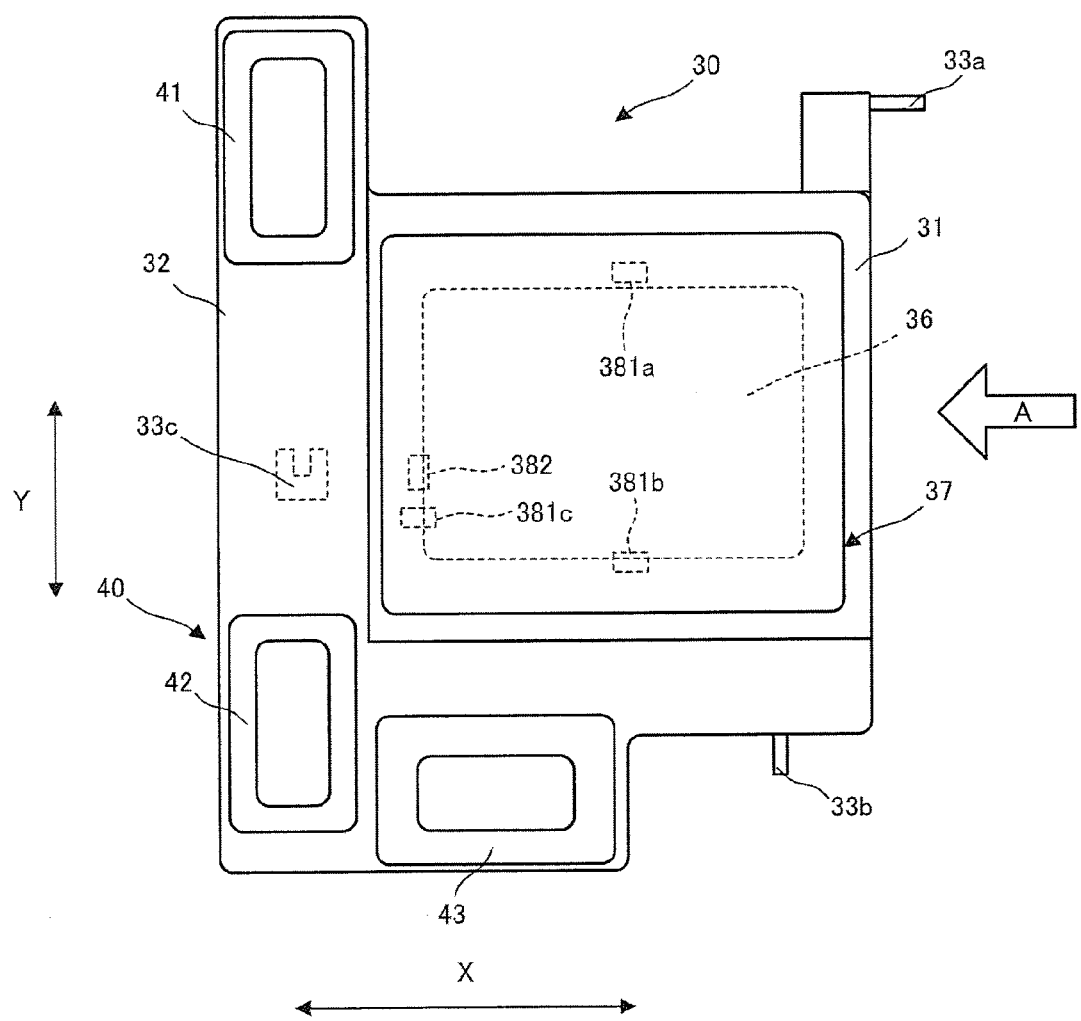
FIG. 3 is illustrative of the moving part 30.
Figure 4:
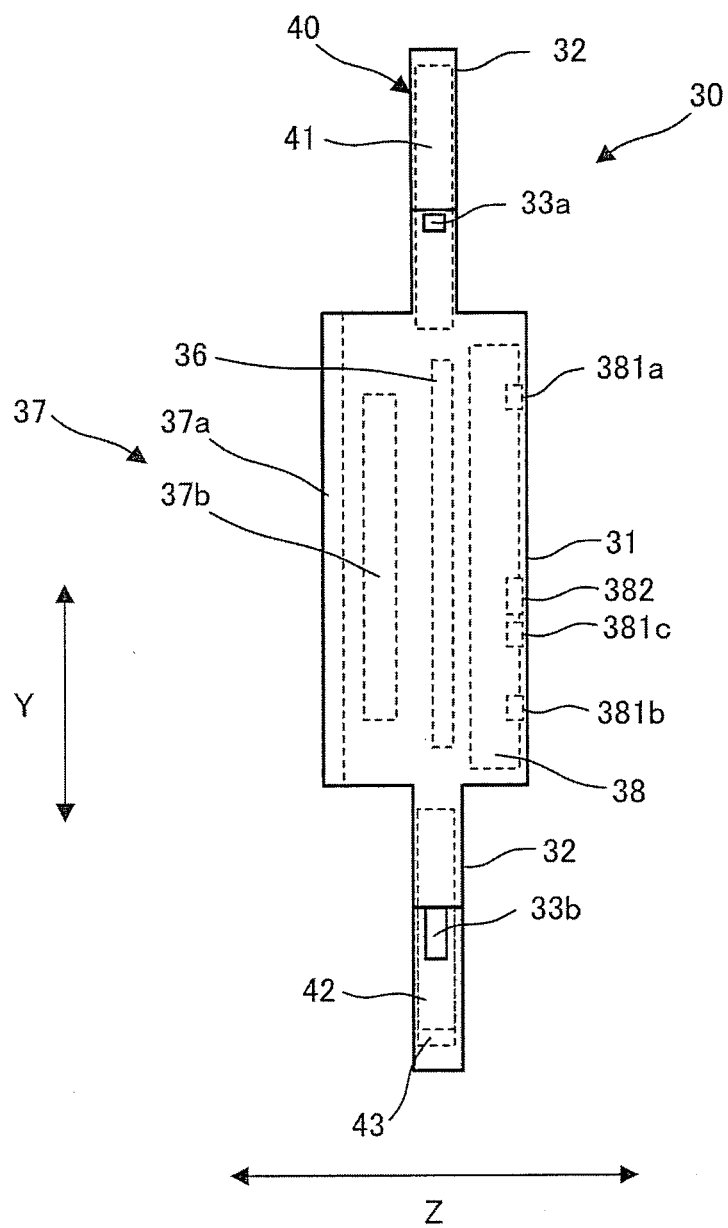
FIG. 4 is a view of FIG. 3 as viewed from Arrow A.

FIG. 3 is illustrative of the moving part 30, and FIG. 4 is a view of FIG. 3 as viewed from Arrow A. The moving part 30 comprises a moving body 31 formed of a nonmagnetic material such as an aluminum alloy or synthetic resin, a coil housing 32 provided on a portion of the circumference of the moving body 31, and a second set of spring supports 33a, 33b and 33c for supporting springs (not shown) to support the moving part 30 on the base part 10 in a movable manner. The moving part 30 is further provided with a set of Hall elements 34 and sensors such as a temperature sensor 35.

Here the X direction is defined as a first direction to the moving part 30, and the Y direction is defined as a second direction orthogonal to the X direction, as depicted in FIG. 3.

The moving body 31 includes an imaging device 36 for photoelectric conversion of light, a filter group 37 and an electric device 38 mounted on it. The filter group 37 comprises an ultrasonic filter 37a and an infrared cut filter 37b as viewed from its side away from the imaging device 36. On the side of the filter group 37 opposite to the imaging device 36 there is the electric device 38 mounted to detect the quantity of light received at the imaging device and process image signals or the like based on that quantity of light received.

As shown in FIGS. 3 and 4, the moving part 30 is provided as one example of the electric device 38 with Hall elements 381a, 381b and 381c for detection of the relative position of the moving part 30 to the base part 10. The Hall elements 381a, 381b and 381c are sensors that produce signals in conformity with a magnetic field in a moving position; in the embodiment of the invention here, the relative positions of the moving part 30 in the X and Y directions are detected on the basis of outputs from the three Hall elements 381a, 381b and 381c. It is to be noted that on the base part 10 side there is a magnet part (not shown) provided for the purpose of forming the magnetic field to be detected by the Hall elements 381a, 381b and 381c. The electric device 38 includes, and is constructed from, a temperature sensor 282. The temperature measured by the temperature sensor 382 is used for compensation of output changes of the Hall elements 381a, 381b and 381c or the like caused by temperature changes.

The coil housing 32 is provided on a portion of the circumference of the moving body 31 and has a recess for stowing the coil group 40. The moving body 31 is longer than the coil housing 32 in the Z direction orthogonal to the X and Y directions.

The coil group 40 comprises a first coil 41, a second coil 42 and a third coil 43. The first coil 41 is located in opposition to the first 21 and the second magnet part 22 on the base part 10 shown in FIG. 2. The second coil 42 is located in such a way as to oppose to the third 23 and the fourth magnet part 24 on the base part 10 shown in FIG. 2, and the third coil 43 is located in such a way as to oppose to the fourth 24 and the fifth magnet part 25 on the base part 10 shown in FIG. 2.

Figure 5:
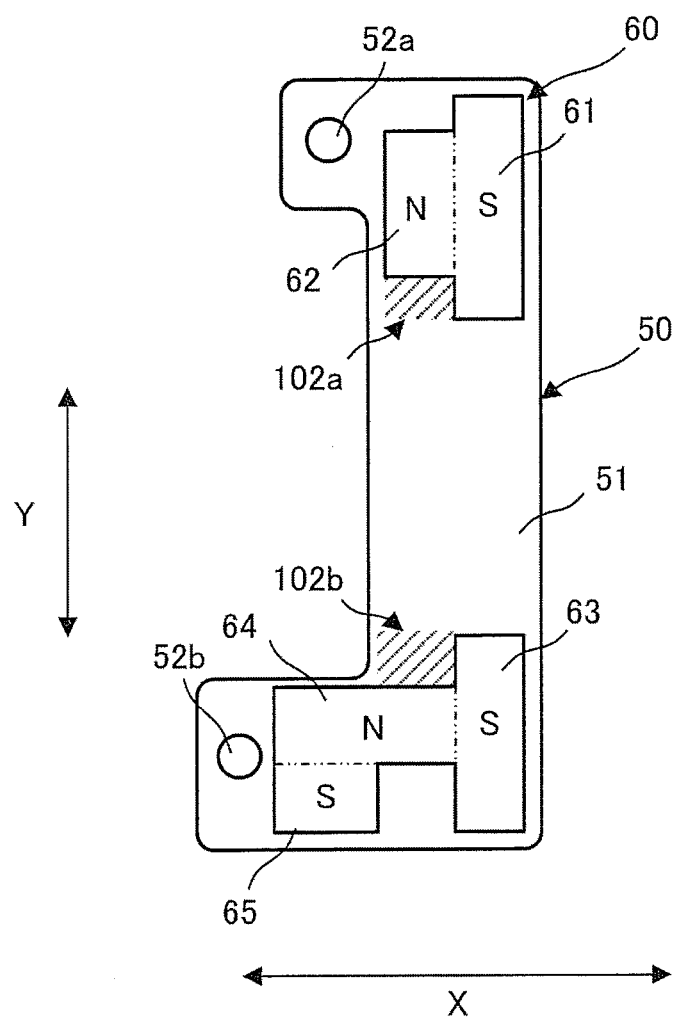
FIG. 5 is illustrative of the magnet support part 50.

FIG. 5 is illustrative of the magnet support part 50 of FIG. 1, as viewed from the moving part 30 side.

The magnet support part 50 comprises a flat plate support body 51 formed of a magnetic material such as iron or an iron compound, and supporting through-holes 52a and 52b that are provided through the support body 51 for inserting screws (not shown) through it to support the magnet support part 50 relative to the base body 10.

Here the X direction is defined as a first direction to the magnet support part 50, and the Y direction is defined as a second direction orthogonal to the X direction, as shown in FIG. 5.

The second permanent magnet group 60 on the magnet support part 50 comprises a first opposite magnet part 61 that is S-magnetized on the coil group 40 side, a second opposite magnet part 62 that is opposite to the first opposite magnet part 61 and N-magnetized on the coil group 40 side, a third opposite magnet part 63 that is located away from the first opposite magnet part 61 in the Y direction and S-magnetized on the coil group 40 side, a fourth opposite magnet part 64 that is opposite to the third opposite magnet part 63 in the X direction and N-magnetized on the coil group 40 side, and a fifth opposite magnet part 65 that is in opposition to the fourth magnet part 64 in the Y direction and S-magnetized on the coil group 40 side. Note here that the first 61 to the fifth opposite magnet part 65 are oppositely magnetized on the coil group 40 side and the opposite side.

The side of the fourth opposite magnet part 64 in the Y direction of the second opposite magnet part 62 has a cutout and is shorter than the first opposite magnet part 61, with a third space 102*a* serving as a cutout that is not in opposition to the first opposite magnet part 61, and the side of the second opposite magnet part 62 in the Y direction of the fourth opposite magnet part 64 has a cutout and is shorter than the third opposite magnet part 63, with a fourth space 102*b* serving as a cutout that is not in opposition to the third opposite magnet part 63.

Figure 6:
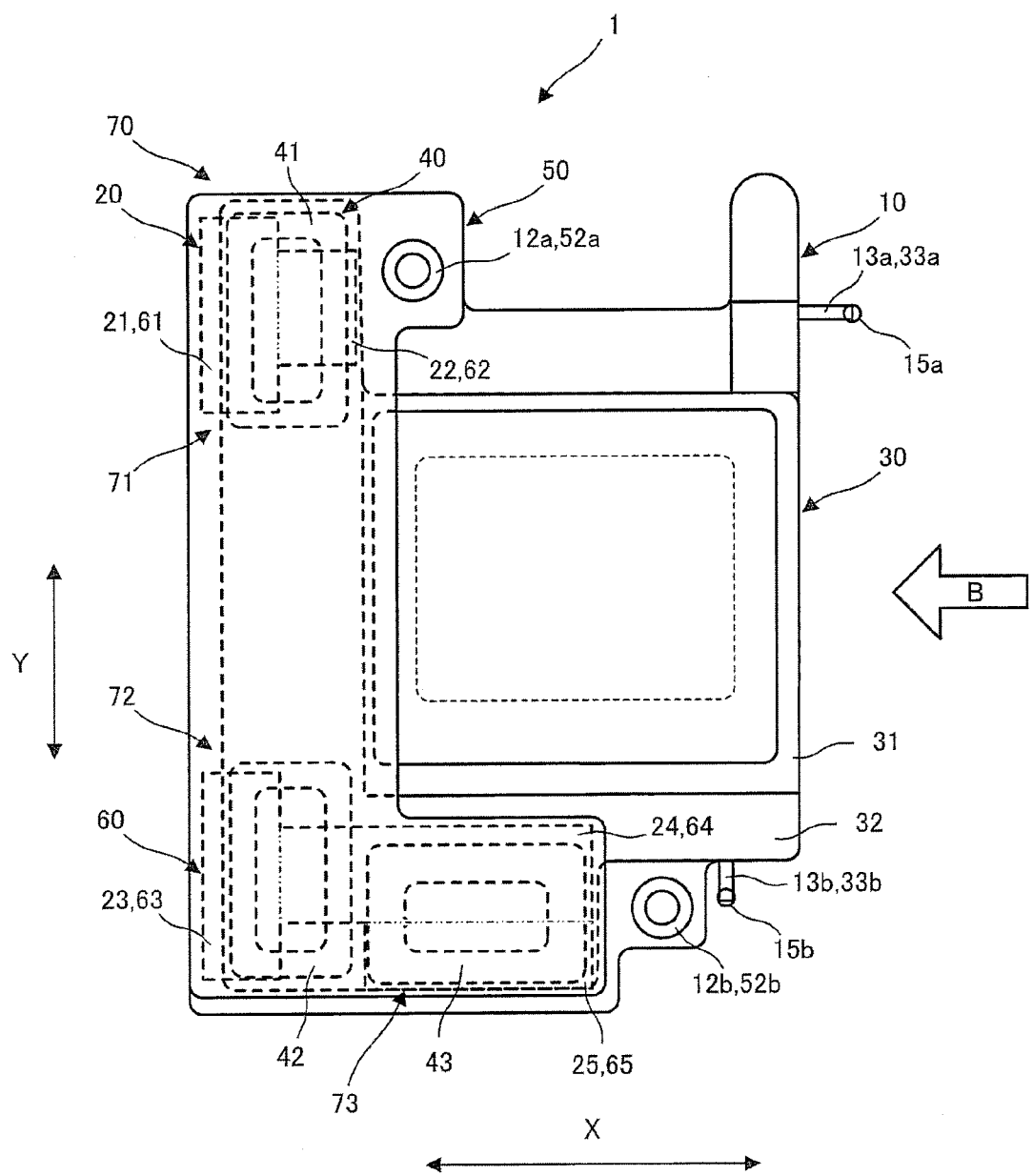
FIG. 6 is illustrative of the after-assembly image-shake correction apparatus according to one embodiment of the invention.
Figure 7:
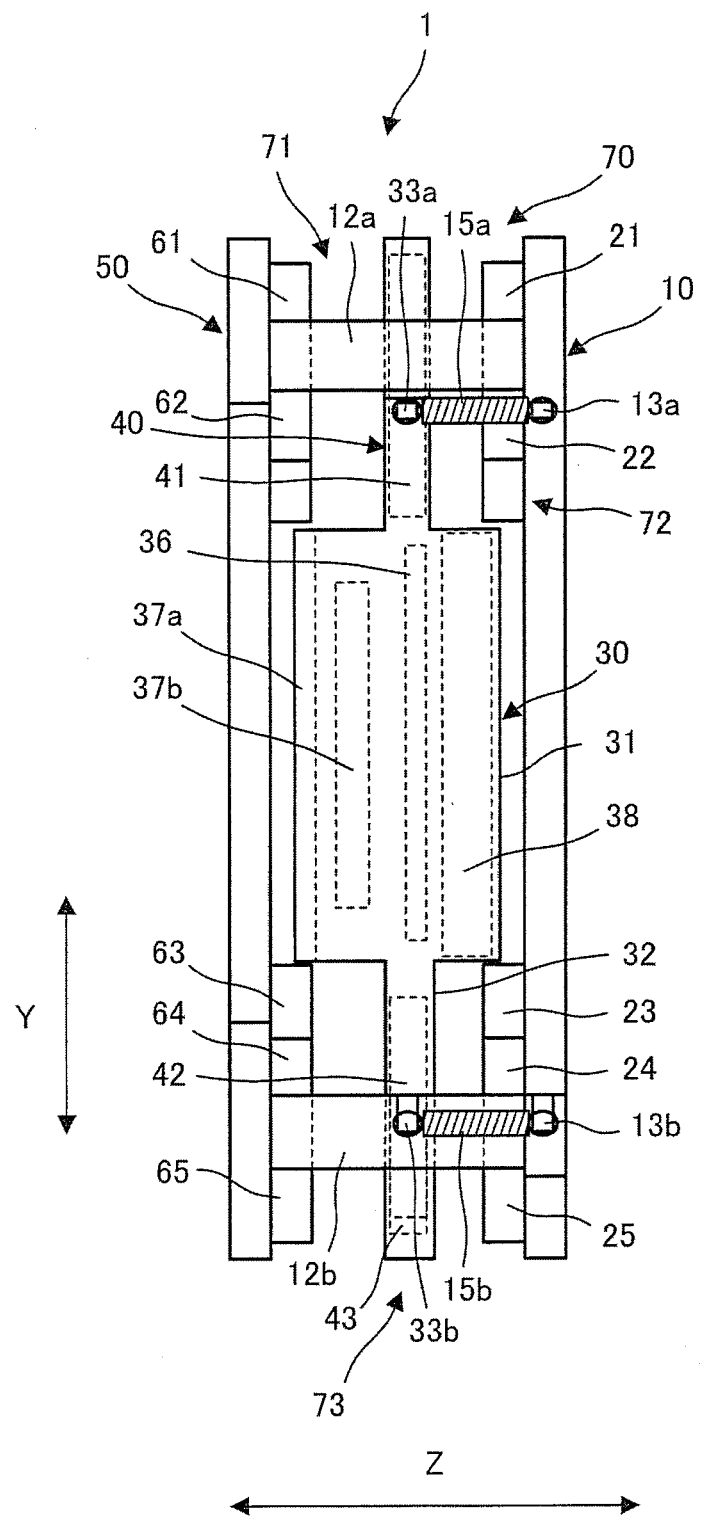
FIG. 7 is a view of FIG. 6 as viewed from Arrow B.

FIG. 6 is illustrative of the image-shake correction apparatus 1 assembled according to the embodiment of the invention here, and FIG. 7 is a view of FIG. 6 as viewed from Arrow B.

To assemble the image-shake correction apparatus 1 according to the embodiment of the invention here, screws (not shown) are inserted through the supporting through-holes 12*a* and 12*b* in the base part 10 shown in FIG. 1 and the threaded through-holes 52*a* and 52*b* in the magnet support part 50, and the support body 51 of the magnet support part 50 is supported by a plate 14 attached to the base body 11 of the base part 10. Consequently, the support body 51 will be firmly supported on the base body 11 at three sites: supporting through-holes 12*a* and 12*b* and plate 14. In addition, the first spring supports 13*a*, 13*b* and 13*c* on the base part 10 and the second spring supports 33*a*, 33*b* and 33*c* are connected together by means of coil springs 15*a*, 15*b* and 15. Thus, the base part 10 is connected with the moving part 30 by means of the coil springs 15*a*, 15*b* and 15*c* so that the moving part 30 is movable relatively to the base part 10.

Further, the base part 10 and moving part 30 may be supported by balls so as to provide smooth movement of the moving part 30. In the ball support fashion here, there are one or more spherical ball members supported across a moving object: as those balls roll, it allows for smooth movement of the moving object. As the ball support fashion is applied to the embodiment of the invention here with the ball members located between the base part 10 and the moving part 30, it makes sure smooth movement of the moving part 30.

With the image-shake correction apparatus 1 assembled in place, the first permanent magnet group 20 of the base part 10 is opposite to, and away from, the second permanent magnet group 60 of the magnet support portion 50. In a space between the first permanent magnet group 20 and second permanent magnet group 60, there is a magnetic field generated in a space between the magnets because the they are oppositely magnetized. Then, the coil group 40 of the moving part 30 is located in a discrete space having the magnetic field generated in it. Such arrangement of the first permanent magnet group 20, second permanent magnet group 60 and coil group 40 allows for formation of a voice coil motor 70.

In the embodiment of the invention here, the first and second magnet parts 21 and 22, first coil 41 and first and second opposite magnet parts 61 and 62 are combined together into a first X-direction voice coil motor 71 operating as a first voice coil motor for moving the moving part 30 in the X direction defined as the first direction, and the third and fourth magnet parts 23 and 24, second coil 42 and third and fourth opposite magnet portions 63 and 64 are combined together into a second X-direction voice coil motor 72 operating as a first voice coil motor for moving the moving part 30 in the X direction defined as the first direction. Further, the fourth and fifth magnet parts 24 and 25, third coil 43 and fourth and fifth opposite magnet parts 64 and 65 are combined together into a Y-direction voice coil motor 73 operating as a second voice coil motor for moving the moving part 30 in the Y direction defined as the second direction.

In the embodiment of the invention here, the second X-direction voice coil motor 72 and the Y-direction voice coil motor 73 share the use of the fourth magnet part 24 and the fourth opposite magnet part 64. Thus, the magnet and opposite magnet parts are so shareable among a plurality of voice coil motors that both the part count and the area of arrangement can be reduced.

In the embodiment of the invention here, as electric currents flow through the first and second coils 41 and 42, it causes the moving part 30 to move in the X direction, and as an electric current flows through the third coil 43, it causes movement of the moving part 30 in the Y direction.

Figure 8:
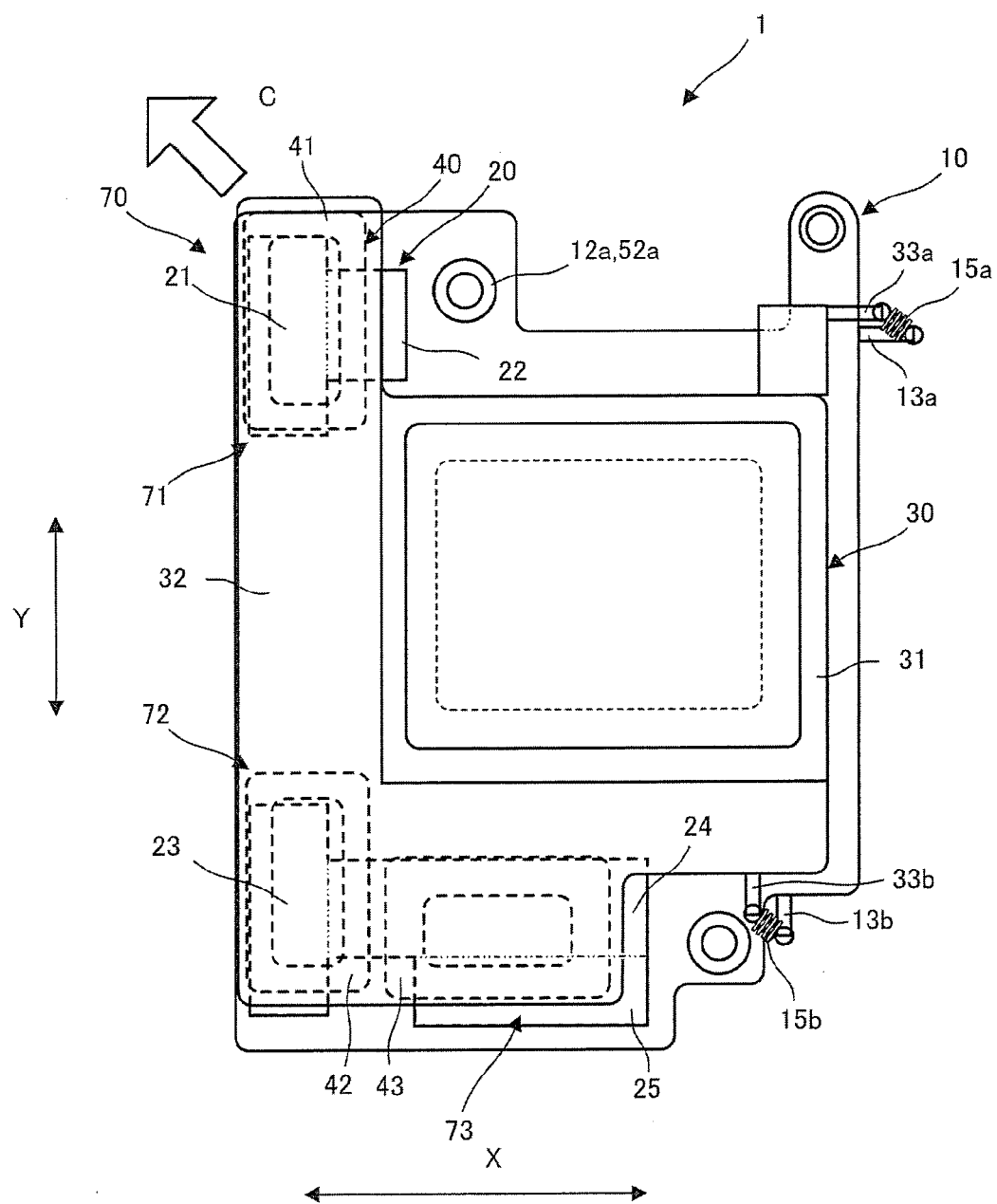
FIG. 8 is illustrative of the operation of the after-assembly image-shake correction apparatus according to one embodiment of the invention.
Figure 9:
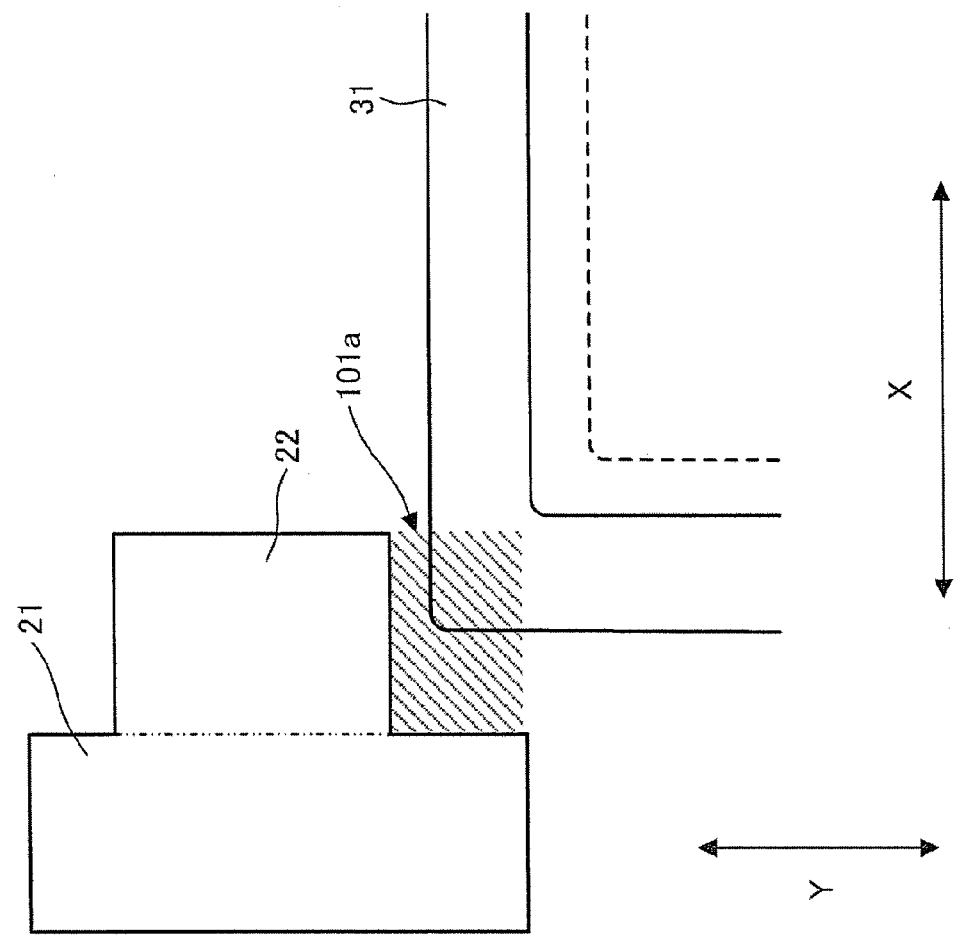
FIG. 9 is an enlarged view of a portion of FIG. 8.

FIG. 8 is illustrative of the operation of the image-shake correction apparatus 1 assembled according to the embodiment of the invention here, and FIG. 9 is an enlarged view of a portion of FIG. 8. It is here to be noted that the magnet support part 50 is left out of FIG. 8 for the purpose of making movement of the moving part 30 more legible, and only the first and second magnet parts 21 and 22 are shown together with the moving body 31 in FIG. 9.

As shown typically in FIG. 8, suppose now that the moving part 30 moves relative to the base part 10 in a direction indicated by Arrow C. Thereupon, the moving body 31 comes closer to the first and second magnet parts 21 and 22, as shown in FIG. 9. If the Y-direction length of the second magnet part 22 is the same as the Y-direction length of the first magnet part 21, then the moving body 31 will interfere with the second magnet part 22.

In the embodiment of the invention here, therefore, the first 21 and the second magnet part 22 are made asymmetric in size so that the moving range of the moving part 30 is extended. Specifically, the Y-direction length of the second magnet part 22 is made shorter than the Y-direction length of the first magnet part 21 so that there can be a first space 101*a* formed for movement of the moving part 30. Thus, if the sizes of the first 21 and the second magnet part 22 are asymmetric, then it is possible to avoid interference of the moving body 31 with the second magnet part 22 and reduce the size of the apparatus.

In the embodiment of the invention here, it is to be noted that other magnet part, too, may be asymmetric in configuration to provide a space for movement of the moving part 30. It is thus possible to avoid interference of the moving body 31 with that magnet part or interference of that magnet part with other member, thereby reducing the size of the apparatus without narrowing down the moving range of the moving part 30.

While the embodiment of the invention here is explained with reference to a specific arrangement having permanent magnet groups in both the base part 10 and the magnet support part 50, it is to be understood that only one of them may include permanent magnet groups provided that there is an output capable of moving the moving part 30.

How to implement corrections with the position detection apparatus according to the embodiment of the invention here will now be explained with reference to some drawings. Amid size reductions of the imaging apparatus in mounting need, voice coil motors or the like, too, are being designed to become small. Amid size reductions of the position detection apparatus in mounting need, the range of detection according to the embodiment of the invention here is extended as far as the area so far not taken into consideration to achieve size reductions of the position detection apparatus. In such an extended area, the magnetic flux density takes on a nonlinear form where the output of the position detection apparatus cannot be used directly as position data.

On the other hand, magnetic sensors such as Hall elements used for position detection apparatus are known to have output values fluctuating owing to ambient temperature changes. Where a position detection apparatus is used with the range of detection extended as far as an area where the magnetic flux density becomes nonlinear as described above, detection errors of position data become extremely noticeable under the influences of ambient temperatures. Especially at high or low temperatures, it is not possible to achieve precise position detections in a peripheral position where the amount of movement of the moving part 30 grows large. This will in turn give rise to a problem that camera-shake correction will not work in the peripheral position or the moving part 30 will come out of the control range, striking against the base part 10.

Figure 10:
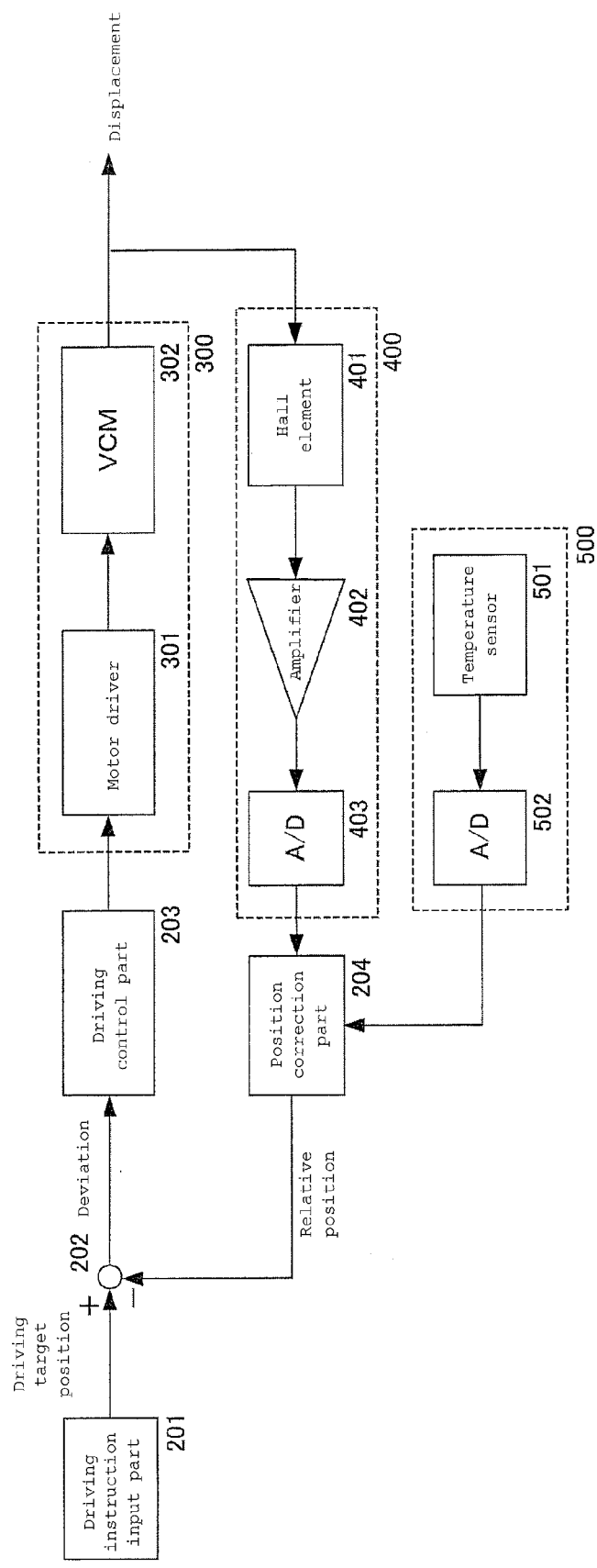
FIG. 10 is a block diagram for the control makeup of the image-shake correction apparatus.

According to the embodiment of the invention here, position data and ambient temperatures are used for temperature compensation with the range of detection extended as far as the area having a nonlinear magnetic flux density so that high-precision position detection is enabling all over the driving area. FIG. 10 is illustrative of the control makeup for the image-shake correction apparatus according to the embodiment of the invention here. As shown in FIG. 10, the position detection apparatus is made up of a position detection part 400, a temperature detection part 500, and a position correction part 204.

Entered into a drive instruction input part 201 is a driving target position calculated on the basis of an output value from a gyro sensor or the like mounted on the imaging apparatus body. In the embodiment of the invention here, the position detection part 400 is made up of a Hall element 401, an amplifier 402, an A/D convertor (AD convertor) 403, and a position correction part 204. As explained with reference to FIGS. 3 and 4, the Hall element 401 is a sensor mounted on the side of the moving part 30, producing position data corresponding to a magnetic field in a moving position. After amplified by the amplifier 402, the position data produced out of the Hall element 401 is converted by the A/D convertor 403 into a digital signal. The position correction part 204 makes correction of the digital signal produced out of the A/D convertor 403 on the basis of a signal from the temperature detection part 500, producing information about the (relative) position of the moving part 30 relative to the base part 10.

The temperature detection part 500 is made up of a temperature sensor 501 and an A/D converter 502. The temperature sensor 501 is positioned near Hall elements 381*a*, 381*b* and 381*c* as shown in FIGS. 3 and 4, producing a signal in conformity with the ambient temperature. The A/D convertor 502 converts an output signal from the temperature sensor 501 into a digital signal that is in turn sent out to the position correction part 204.

The position data corrected and produced out of the position correction part 400 is calculated in terms of a difference between it and the driving target position entered into a computation part 202 from the driving instruction input part 201. The calculated deviation is entered into a driving control part 203 that then executes PID control, well known for feedback control, on the basis of the entered deviation. This PID control implements computation with proportional operation, integral operation and differential operation as fundamental operations, producing a signal corresponding to the driving force. The signal corresponding to the driving force, produced out of the driving control part 203, is entered into a driving part 300 including a motor driver 301 and a VCM (voice coil motor) 302. The position of the moving part 30 moved by the driving of VCM 302 is detected by a Hall element 402 for reuse for the driving of VCM 302.

Implementing such feedback control, the image-shake correction apparatus 1 according to the embodiment of the invention here enables VCM 302 to be so driven that the moving part 30 can be moved to the driving target position. In what follows, how to compensate for temperatures by the position correction part 204 within the position detection part 400 will be explained.

Figure 11:
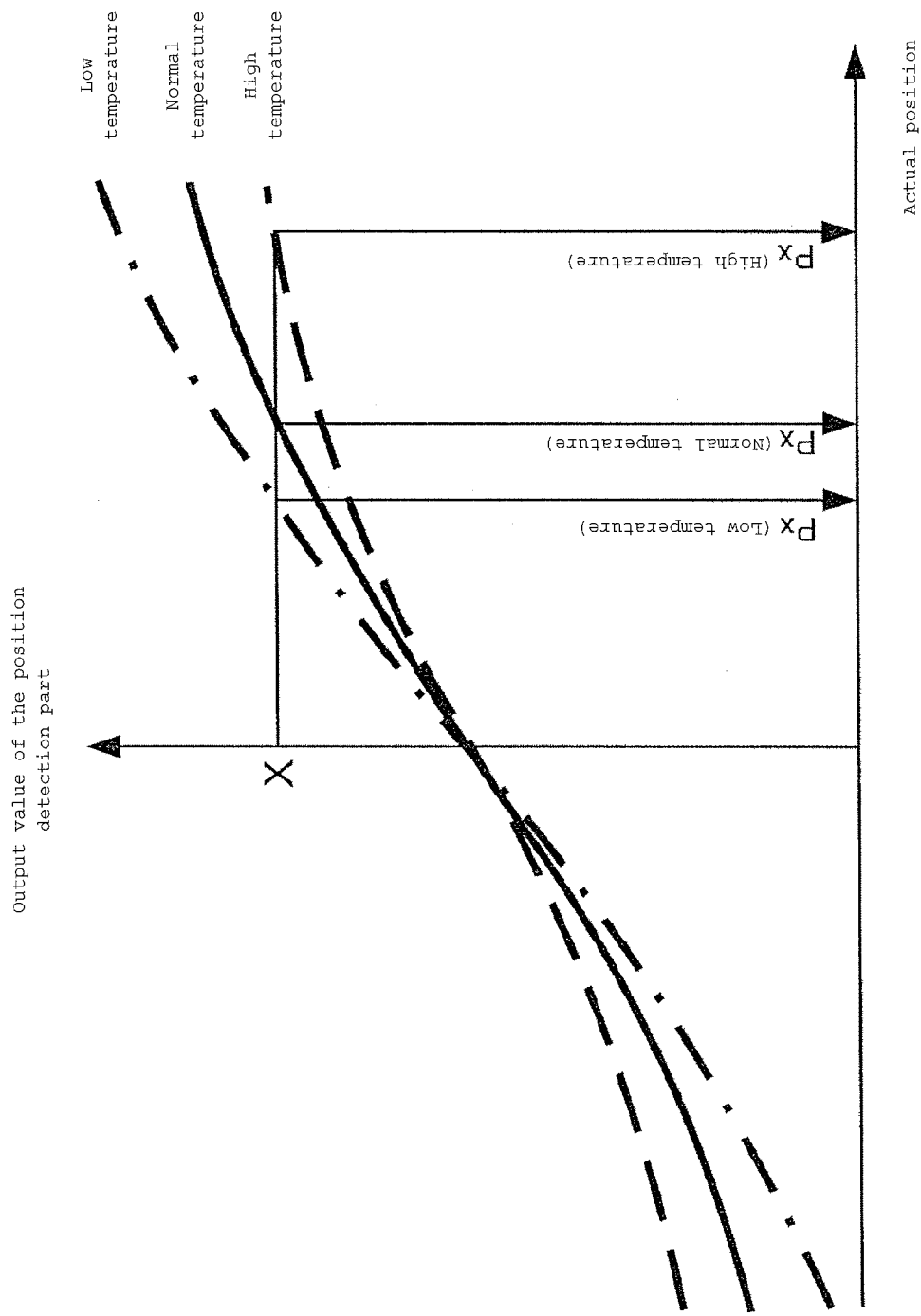
FIG. 11 is indicative of detection errors of the position detection part 100 due to temperature changes.

FIG. 11 is indicative of detection errors of the position detection part 400 thanks to ambient temperature changes. In FIG. 11 there are actual positions Px of the moving part 30 indicated at the time when the position detection part 400 produces the same value X in three cases: normal temperature, low temperature, and high temperature. It is found that as the ambient temperature rises, the actual position to be detected grows large. This causes the position detection part 400 to have detection errors in association with ambient temperature changes.

According to the embodiment of the invention here, in a particular situation where the detection area is extended as far as an area having a nonlinear magnetic flux density, detection errors of the position detection part 400 are qualitatively analyzed to make calculation of the detection errors easy.

Figure 12:
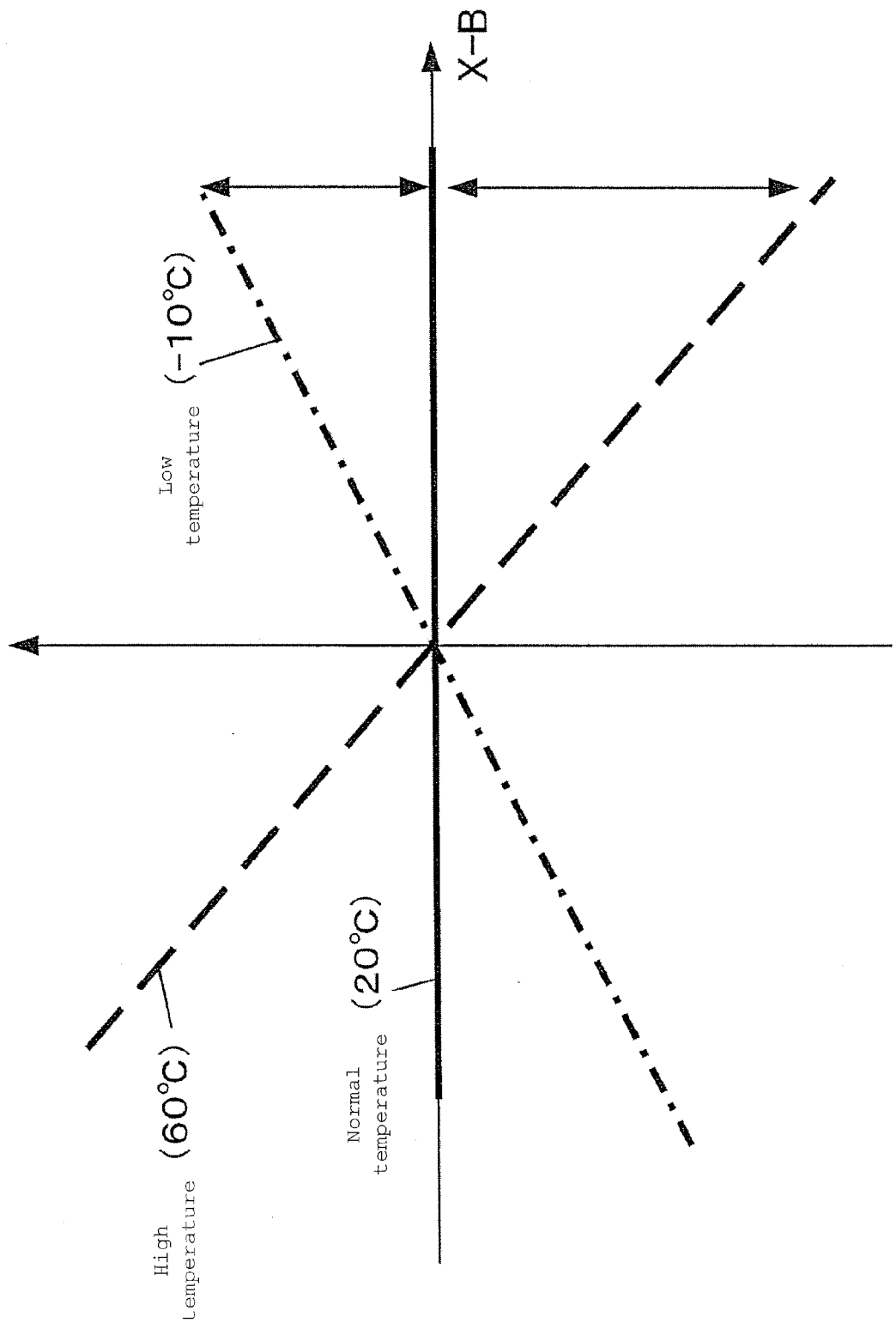
FIG. 12 is indicative of relations of a difference (X−B) between the detection position X and a given value B to detection errors.

FIG. 12 is indicative of relations of detection errors to a difference (X−B) between a detection position X of the position detection part and a given value B, where the given value B matches with an analog output voltage (reference voltage of the position detection part 400) produced out of the position detection part 400 at the time when the magnetic field to the Hall element 401 is zero (or in the absence of any magnetic field): to this, 2048 [LSB] that is an intermediate value of a 12-bit AD value is here assigned in the A/D 403. In this graph, detection errors at low (−10° C.) and high (60° C.) temperatures with the ambient temperature of 20° C. as a reference are indicated by a one-dotted line and a dotted line, respectively. As can be seen from this graph, the detection errors of the position detection part 400 are proportional to the difference (X−B) between the detection position X and the given value B.

Figure 13:
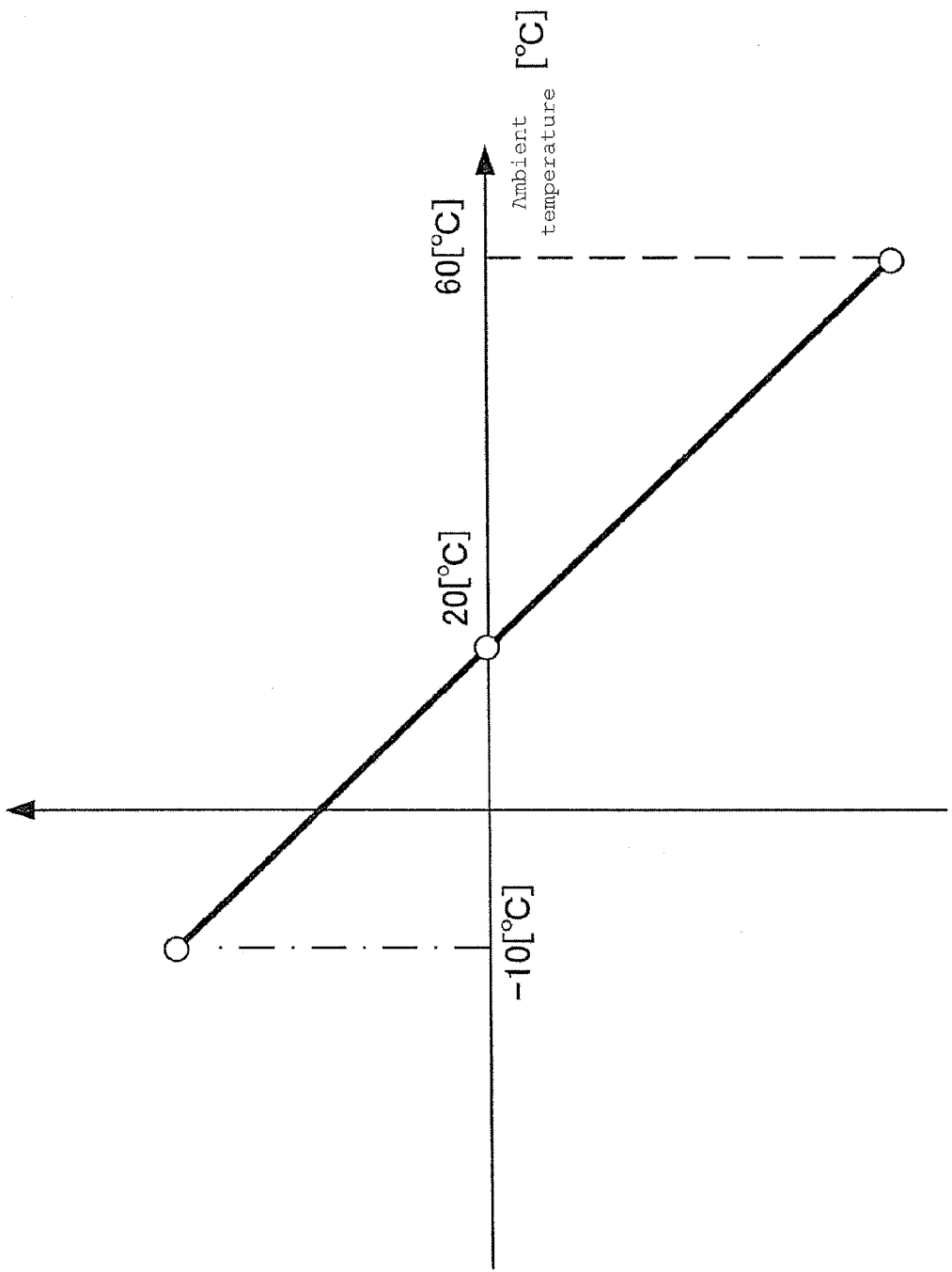
FIG. 13 is indicative of relations of the ambient temperature to a gradient of detection errors.

Further qualitative analyses have revealed that the detection errors have a gradient proportional to the ambient temperature. In FIG. 13 relations between the ambient temperature and the gradient of detection errors are graphically plotted. That is, the relations between the gradient of detection errors and the ambient temperature are graphed with the proviso that normal temperature (20° C.) is used as a reference in the graph of FIG. 12. As can be seen from this graph, the gradient of detection errors is proportional to an ambient temperature T.

Consequently, the detection error Z (correction value) of the position detection part 400 is figured out from the following equation:

$$Z=A*(X-B)*(T-C) \quad (A)$$

where X is position data produced out of the position detection part,

A is a coefficient based on temperature characteristics,

B is a value based on the reference voltage of the position detection part,

C is a value based on a reference temperature,

T is an ambient temperature, and

* is the multiplication sign.

This detection error (correction value) is subtracted from the value produced by the position detection part 400 to figure out a detection position Y after correction.

$$Y=X-A*(X-B)*(T-C) \quad (1)$$

where Y is the corrected detection position.

Thus in the embodiment of the invention here, the position detection part 400 is used in the area having a nonlinear magnetic flux density not used so far for the reason of its unstable output, in which case the detection error calculated by the qualitative analysis based on the relations with the ambient temperature as described above is used to make correction of the output position of the position detection part 400. Consequently, while the position detection part 400 is used in the area having a nonlinear magnetic flux density, it is possible to make correction of the influences of the ambient temperature on the magnetic flux density using such a simple equation as represented by (1).

Figure 14:
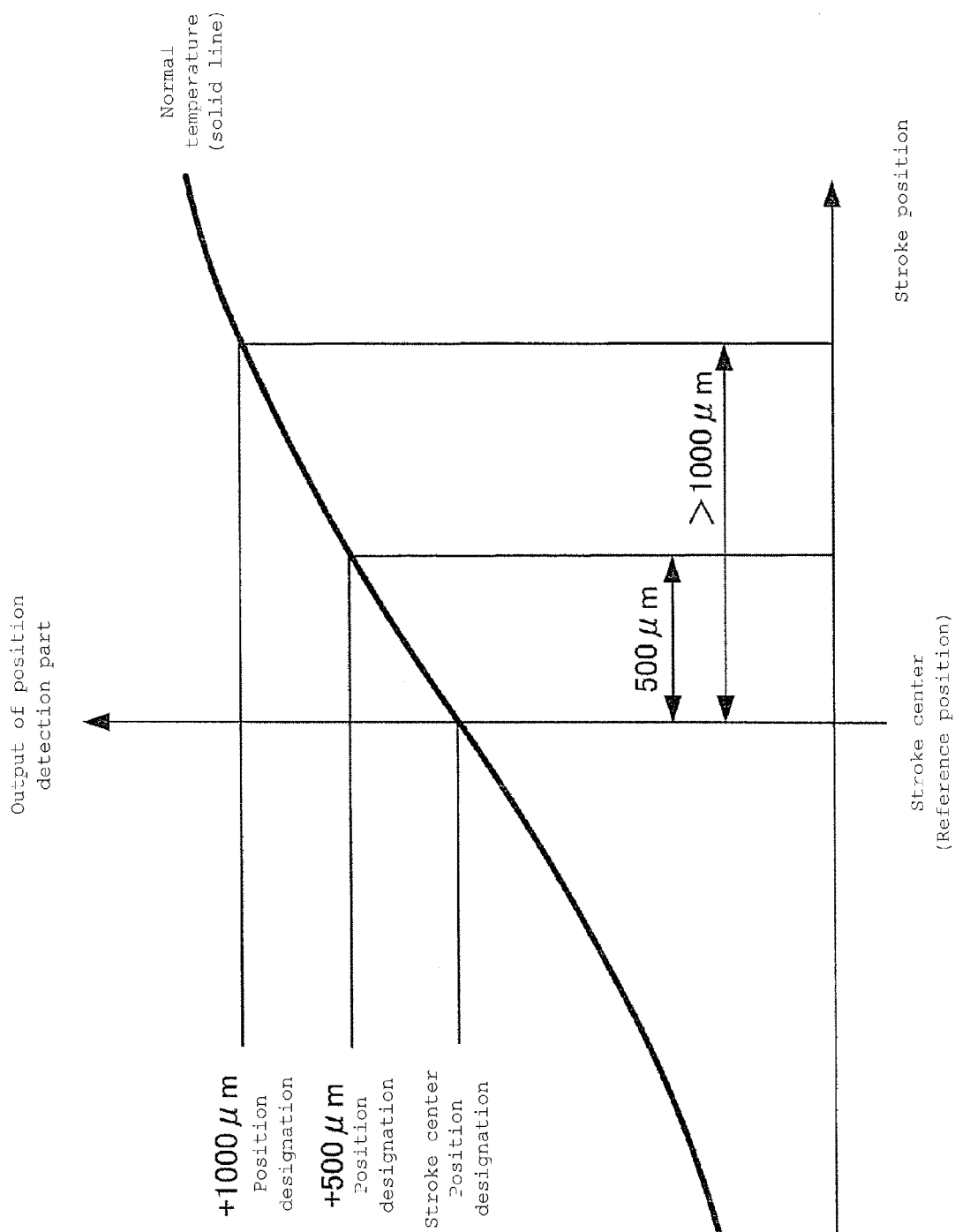
FIG. 14 is indicative of the nonlinearity of the position detection part 400.

Generally, such feedback control is implemented such that the difference between the output of the position detection part 400 and the driving target position becomes zero; when such an output of the position detection part 400 as shown in FIG. 14 has a nonlinear relation to the actual position of the moving part 30, however, it is necessary to make correction of the output of the position detection part 400. For instance, when there is an instruction issued to move the moving part 30 500 μm away from the stroke center with the output of the position detection part 400 as the reference as shown, an actual stroke position of the moving part 30 will move about 500 μm. When there is an instruction issued to move the moving part 30 1,000 μm with the output of the position detection part 400 as the reference, however, an actual stroke position of the moving part 30 will move more than that for the reason of the peripheral area's nonlinearity.

Figure 15:
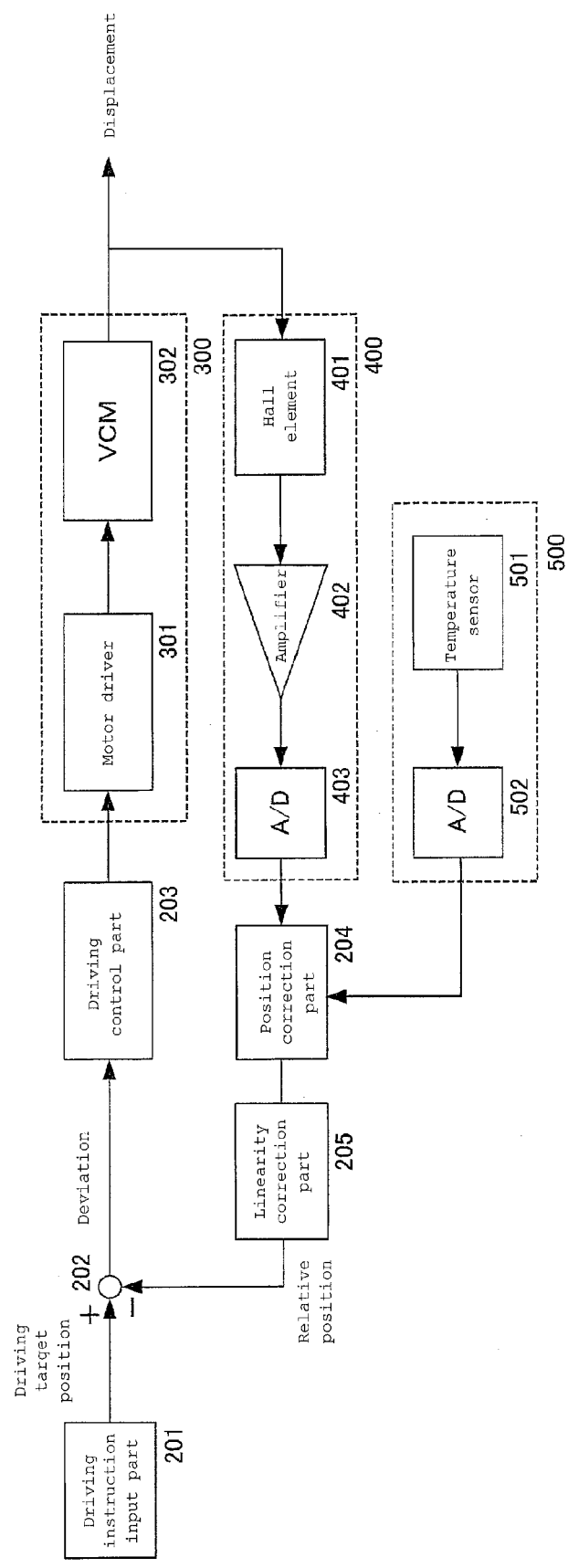
FIG. 15 is a block diagram for the control makeup of the image-shake correction apparatus according to another embodiment of the invention.

FIG. 15 is a block diagram for the camera-shake correction apparatus for correction of such nonlinearity of the position detection part 400. In FIG. 15, a linearity correction part 205 is provided for the correction of nonlinearity of the position detection part 400. In the embodiment of the invention here, nonlinearity is corrected by computation using a cubic equation ($Y=AX^3+BX^2+CX+D$) where X is a position before the correction of nonlinearity and Y is a position after the correction of nonlinearity. The respective coefficients used in the correction equation: A, B, C and D may be fixed values or variables depending on the amount of movement of the moving part 30. As also shown in FIG. 15, this linearity correction 205 is preferably implemented in the later stage of position correction 204. The reason is that the computation for nonlinearity correction will become complicated before correction for the ambient temperature.

In the embodiment of the invention shown in FIG. 14, the provision of the position correction part 204 plus the linearity correction part 205 allows for correction by the position detection part 400 and correction of the position correction part 400 for nonlinearity. Especially if correction is implemented by the position correction part 204 before nonlinearity is corrected by the linearity correction part 205, it is then possible to facilitate computation by the position detection part 400.

The image-shake correction apparatus according to the embodiment of the invention here may be used with electronic imaging apparatus, inter alia, a digital camera, a video camera or the like, as can be seen from the following exemplary embodiments.

Figure 16:
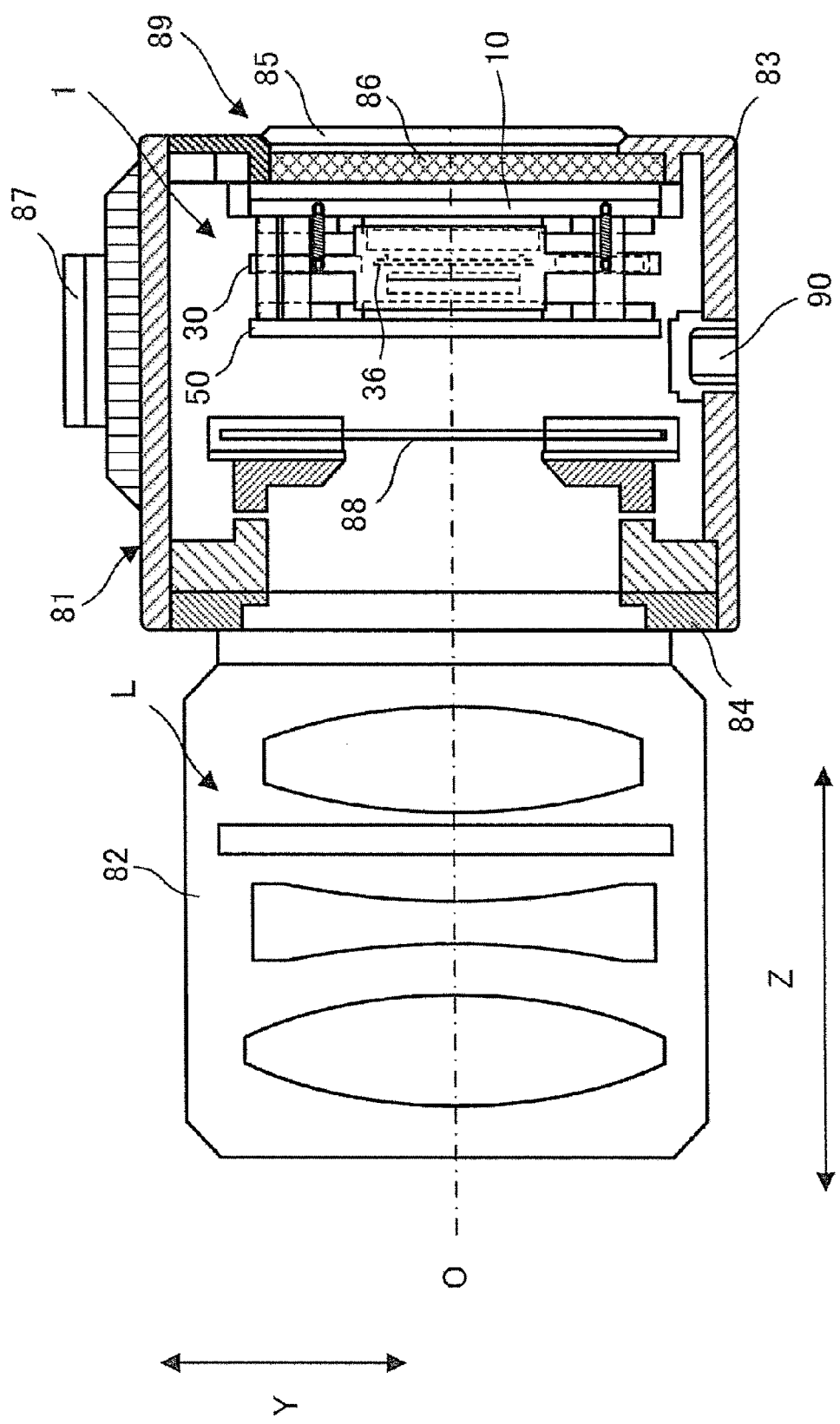
FIG. 16 is illustrative of an imaging apparatus (digital camera) including the image-shake correction apparatus according to one embodiment of the invention.
Figure 17:
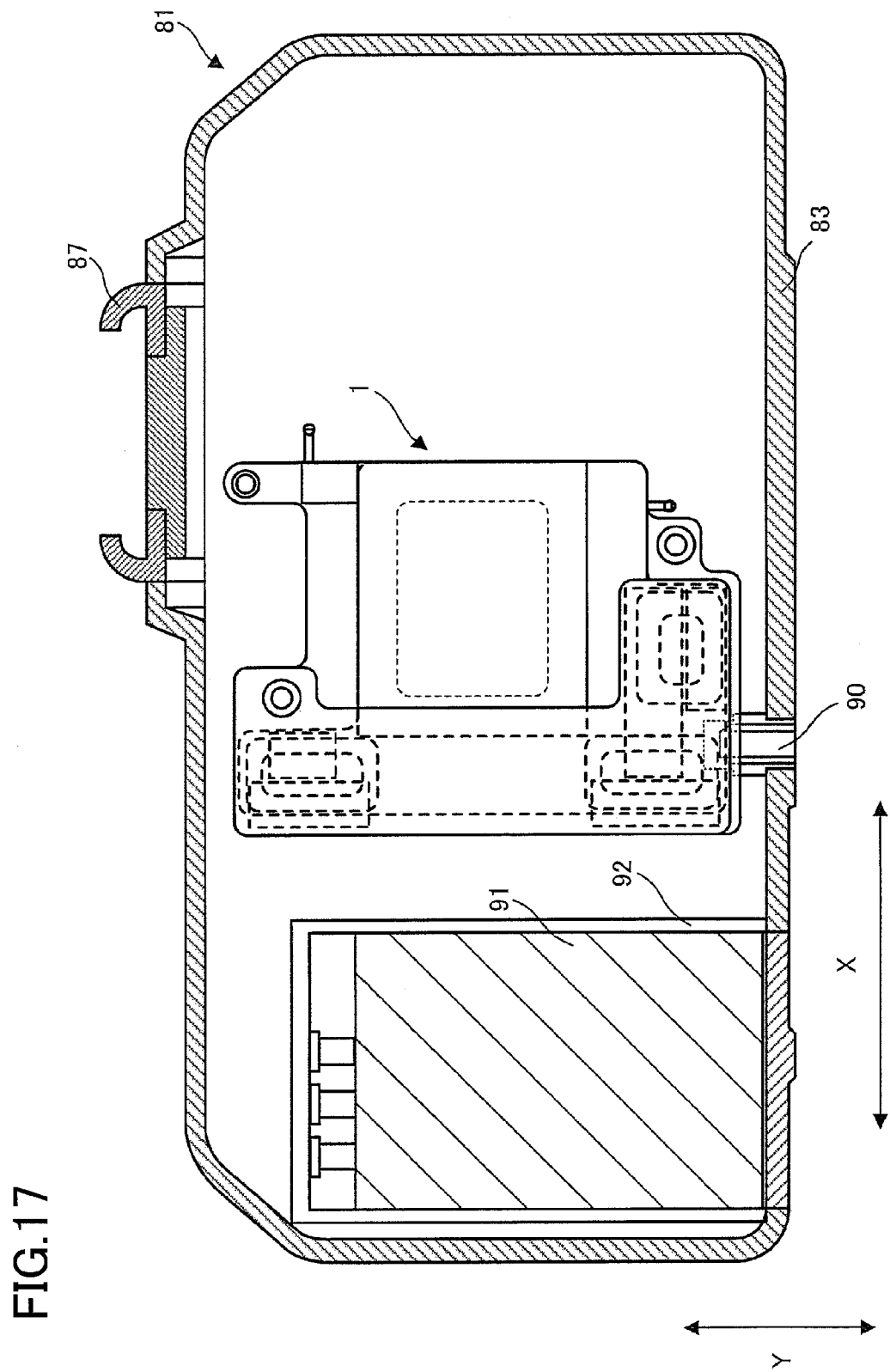
FIG. 17 is illustrative of the image-shake correction apparatus, etc. within the imaging apparatus (digital camera).

FIG. 16 is illustrative of an imaging apparatus comprising the image-shake correction apparatus according to one embodiment of the invention, and FIG. 17 is illustrative of the image-shake correction apparatus, etc. within the imaging apparatus. A digital camera 80 that is an imaging apparatus comprising the image-shake correction apparatus according to one embodiment of the invention comprises a camera body 81, and a lens unit 82 including an imaging lens L that is interchangeably mounted on the camera body 81, as shown in FIGS. 16 and 17.

It is here to be noted that an axis of light entering from the imaging lens L into the camera body 81 is indicated by "O", and that the object side of the cameral body 81 with respect to the axis of incident light is called the front (front surface side) and the imaging side is called the rear (rear surface side). It is also to be noted that of directions orthogonal to the optical axis O, the horizontal direction as viewed from the front in an ordinary operation state is defined as the first or X direction, and the vertical direction is defined as the second or Y direction. The first or X direction and the second or Y direction correspond to the first or X direction and the second or Y direction with respect to the image-shake correction apparatus 1.

The camera body 81 comprises an outer casing 83 also serving as a camera proper that houses therein members forming the digital camera 80, and includes in a front position on the incident optical axis O a ring-like mount 84 for interchangeable mounting of the lens unit 82. On the left side as viewed from the front, the outer casing 83 is provided with a grip (not shown) held by the right hand of a camera operator during imaging operation. Located on top of the grip are various switches and buttons (not shown) such as a release button.

Further, the camera body 81 comprises a battery chamber 92 for stowing away batteries 91 within the outer casing 83. In the rear of the battery chamber 92, there are a circuit board or the like (not shown) provided, including a control circuit for implementing control over the camera, image processing, compression processing, data storage processing or the like, and a memory such as SDRAM and a power source circuit, etc. Furthermore, the camera body 81 has a built-in shake-status detector (not shown) for that camera body which uses a gyro sensor (not shown) or the like as an example.

As shown in FIGS. 16 and 17, the camera body 81 further comprises a liquid crystal panel 86 having a panel display window on the rear surface side of the outer casing 83. This liquid crystal panel 86 is a TFT (thin-film transistor) type of rectangular display panel that is capable of not only displaying taken images but also showing as images various information pieces such as various settings and adjustments. On top of the outer casing 83, there is a hot shoe 87 located for attachment of an optical viewfinder, an electronic viewfinder, an external flash, a microphone, etc.

Within the outer casing 83 of the camera body 81, there are a focal plane shutter 88 and an imaging unit 89 received as shown in FIG. 16. The imaging unit 89 comprises an image-shake preventing apparatus 1 that supports an imaging device 36 such as a CCD and CMOS sensor on the XY plane in a displaceable fashion and uses a voice coil motor as an actuator. This image-shake preventing apparatus 1 operates in response to a shake signal from the above-mentioned shake detector to cancel out forces detected in the shake direction. The imaging device 36 includes a rectangular light-receiving plane having a long side along the X direction. The outer casing 83 is provided on its bottom surface with a tripod screw portion 90.

Figure 18:
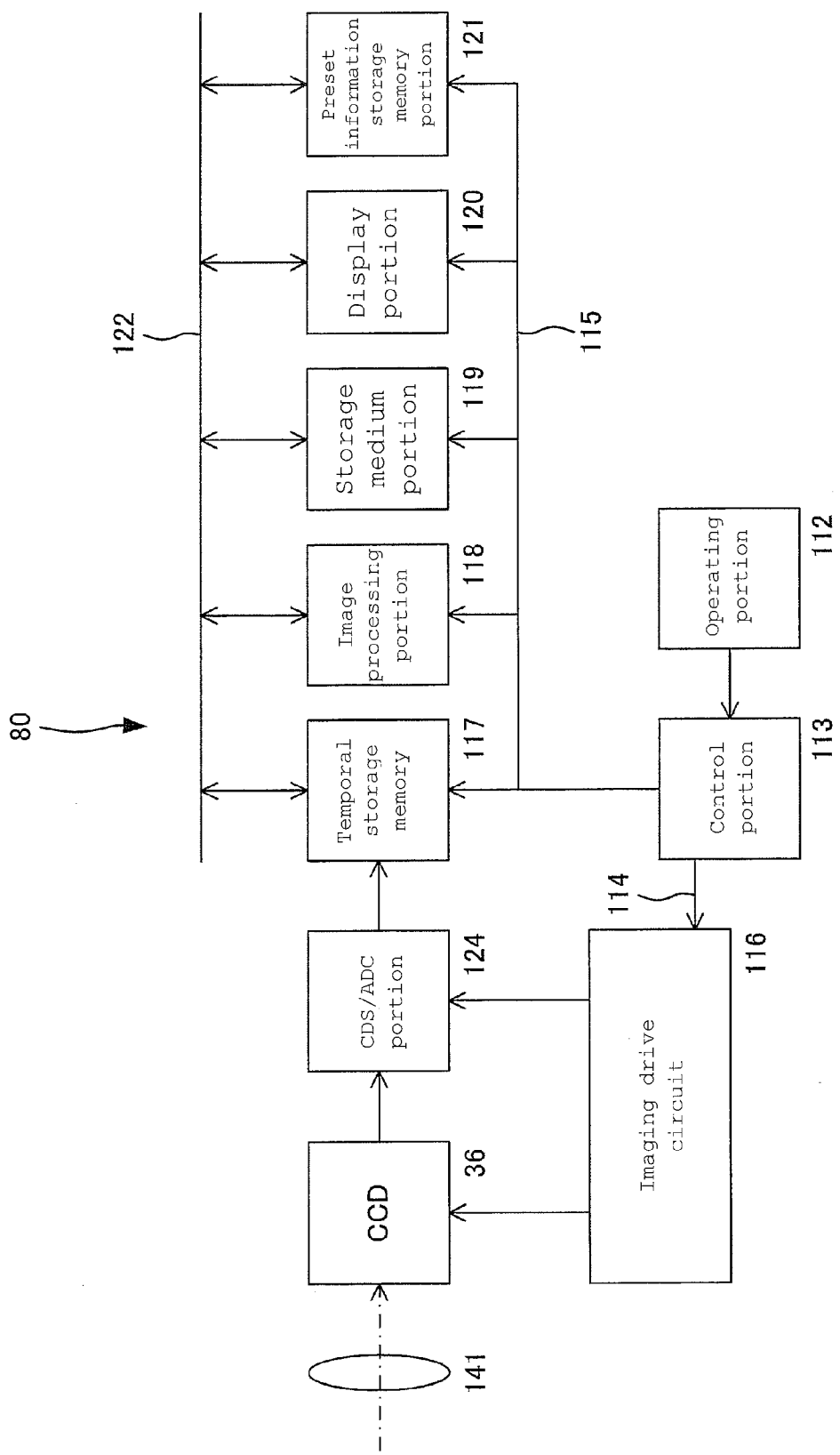
FIG. 18 is a block diagram for the control makeup of the imaging apparatus (digital camera) according to one embodiment of the invention.

FIG. 18 is a block diagram illustrative of the internal circuitry of a main part of the digital camera 80 according to the embodiment of the invention here. In the following explanation, the processing means are constructed typically from a CDS/ADC portion 124, a temporal storage memory 117, an image processing portion 118 and so on, and the storage means is made up of storage medium, and so on.

As shown in FIG. 18, the digital camera 80 includes an operating portion 112, a control portion 113 connected to the operating portion 112, an imaging drive circuit 116 and a temporal storage memory 117 connected to the control signal output port of the control portion 113 via buses 114 and 115, an image processing portion 118, a storage medium portion 119, a display portion 120, and a preset information storage memory portion 121.

The temporal storage memory 117, image processing portion 118, storage medium portion 119, display portion 120 and preset information storage memory portion 121 are designed such that data are mutually entered in or produced out of them via a bus 122, and the imaging drive circuit 116 is connected with the imaging device 36 and CDS/ADC portion 124.

The operating portion 112 is a circuit including various input buttons and switches, through which event information entered (by the camera operator) from outside is notified to the control portion 113. The control portion 113 is a central processing unit that is made up of typically a CPU and has a built-in program memory (not shown): according to the program loaded in that program memory, it has control over the digital camera 80.

The imaging device 36 such as the CCD is the one that is driven and controlled by the imaging drive circuit 116, and converts or transforms light quantity per pixel of the object image formed through the imaging optical system 141 into electrical signals that are in turn sent out to the CDS/ADC portion 124.

The CDS/ADC portion 124 is a circuit that amplifies electrical signals entered from the imaging device 36 and implements analog-to-digital conversion. Then, image raw data (Bayer data: hereinafter called the RAW data) subjected only to amplification and digital conversion are sent out to the temporal storage memory 117.

The temporal storage memory 117 is a buffer made up of typically an SDRAM: it is a memory device for temporal storage of the RAW data produced out of the CDS/ADC portion 124. The image processing portion 118 is a circuit that reads out the RAW data stored in the temporal storage memory 117 or the RAW data stored in the storage medium portion 119 thereby electrically implementing various forms of processing including distortion correction, based on an image quality parameter instructed by the control portion 113.

The storage medium portion 119 detachably receives a card type or stick type of recording medium comprising typically a flash memory so that the RAW data transferred from the temporal memory 117 or image data processed at the image processing portion 118 are recorded and held in that flash memory.

The display portion 120 is made up of a liquid crystal display monitor or the like to display the taken RAW data or image data, operating menus or the like on it. The preset information storage memory portion 121 includes a ROM portion having various image quality parameters previously loaded in it, and a RAM portion for storing an image quality parameter read out of that ROM portion by entering operation of the operating portion 112.

The thus assembled digital camera 80 makes use of the inventive image-shake correction apparatus as the imaging optical system 141, providing an imaging apparatus that is of small-format size and well fit for taking of moving images.

It is to be understood that some embodiments described herein are not intended as limitations on the present invention, and combinations of them may be encompassed in the category of the invention as well.

Although some embodiments according to a certain aspect of the invention have been explained, it is to be understood that they are not intended as limitations on the present invention, and combinations of them are encompassed in the category of the invention as well.

What is claimed is:

1. A position detection apparatus, comprising:
a fixed base,
a moving part movable relatively with respect to the fixed base,
a position detector that detects a position of the moving part relative to the fixed base on the basis of a magnetic flux change to produce first position data,
a temperature detector that detects an ambient temperature,
a controller configured to:
apply a correction computation to the first position data on the basis of the ambient temperature and a difference between the first position data and a given value based on a reference voltage of the position detector to produce second position data on the basis of the following equation (1); and
apply a computation to the second position data to make a correction for nonlinearity of the position detector to produce third position data,
wherein:
the position detector detects position data as far as a position area where, within a position range of relative movement of the moving part to the fixed base, the magnetic flux change in association with a change in an amount of the relative movement is nonlinear:

$$Y = X - A*(X-B)*(T-C) \quad \text{Equation (1)}$$

where X is the first position data produced out of the position detector,
A is a coefficient based on temperature characteristics,
B is a value based on the reference voltage of the position detector,
C is a value based on a reference temperature,
T is the ambient temperature, and
Y is the second position data.

2. The position detection apparatus according to claim 1, wherein: the position detector is configured to produce the first position data by using a Hall element.

3. A position control apparatus, comprising:
the position detection apparatus according to claim 1, and
a driving actuator that applies a driving force to the moving part to move the moving part,
wherein the controller further controls the driving force of the driving actuator on the basis of target position data and the third position data.

* * * * *